United States Patent
Hogan et al.

(10) Patent No.: US 6,785,712 B1
(45) Date of Patent: Aug. 31, 2004

(54) AIRBORNE E-MAIL DATA TRANSFER PROTOCOL

(75) Inventors: Kenneth Hogan, Fountain Valley, CA (US); Micheal Polucha, Garden Grove, CA (US); Trieu Pham, Las Flores, CA (US); Steve Vollum, Portland, OR (US); Jessee Johnston, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 558 days.

(21) Appl. No.: 09/666,428

(22) Filed: Sep. 21, 2000

(51) Int. Cl.[7] .............................................. G06F 13/00
(52) U.S. Cl. ...................................................... 709/206
(58) Field of Search ............................... 709/200, 205, 709/206, 207, 208, 204, 247; 370/315, 316, 317, 318; 714/4, 16, 48, 49, 50, 51

(56) References Cited

U.S. PATENT DOCUMENTS

| | | | |
|---|---|---|---|
| 5,822,526 A | * | 10/1998 | Waskiewicz ................ 709/206 |
| 6,201,797 B1 | * | 3/2001 | Leuca et al. ................ 370/316 |
| 6,449,287 B1 | * | 9/2002 | Leuca et al. ................ 370/468 |

* cited by examiner

Primary Examiner—Robert B. Harrell
(74) Attorney, Agent, or Firm—Nathan O. Jensen; Kyle Eppele

(57) ABSTRACT

An e-mail delivery and transmission system has been developed for an aircraft environment to meet the special needs of the aircraft passenger. Due to the tenuous and expensive nature of the communications link between an aircraft and a ground based e-mail computer server, the system has streamlined the data exchange to provide only the information desired by the passenger, reducing costs and providing a more efficient system. The streamlining includes sequencing frames of data and tracking the delivery status of these frames, such that if there is an interruption of the communication link during the transmission of data, only unsent frames are delivered upon reconnection. Other features include call initiation options for contacting the ground server from the aircraft, and statistics gathering functions for providing the passenger with accrued costs, data transmission, and call time. The system permits the tracking of messages using an assigned identifier for each data package, and data compression is employed to reduce transmission costs.

17 Claims, 15 Drawing Sheets

AIRBORNE E-MAIL DATA TRANSFER PROTOCOL

BACKGROUND OF THE INVENTION

Field of the Invention

The present invention is related to the field of electronic mail (e-mail) delivery and retrieval, and in particular to the retrieval and delivery of electronic mail as well as other electronic data from an aircraft.

SUMMARY OF THE INVENTION

The present invention allows aircraft passengers to send and receive electronic messages such as electronic mail (or "e-mail") while in flight. There are unique challenges encountered when attempting to deliver and receive electronic messages during flight, and the present invention overcomes the inherent obstacles using specially developed protocols and software. The system provides a robust and transparent delivery service for e-mail, overcoming the unique data transfer challenges of the airborne environment.

The system consists of several integrated components that provide a system for the transfer and exchange of electronic mail designed specifically to overcome the difficulties with air-to-ground mail transfer. The system includes an airborne server aboard the aircraft loaded with customized mail server software and a ground server loaded with customized mail server software. The ground server is connected to the internet via internet servers. Communication between the two servers is achieved by an air-to-ground data link and the link is controlled by software on the servers to initiate and terminate the connection. The airborne server is connected via a Ian on the aircraft to multiple personal computers used by passengers to retrieve e-mail messages, and the personal computers preferably include a customized software to control and view message delivery, obtain status information, and control costs and resources of the mail transfer. The airborne server is the component that interacts directly with the passenger's e-mail client software, where the e-mail client software instructs the airborne server to retrieve e-mail messages from the passenger's selected mail server on the internet. E-mail sent by passengers are relayed to internet mail servers through the airborne server across the air-to-ground link.

The present invention recognizes the costs of the air-to-ground data link as well as the tenuous nature of the link, and employs specifically created software to control the use of the link in order to maximize its performance. For example, the transfer of data attachments to e-mail messages can unnecessarily prolong the connection of the data link to the detriment of the passenger, who is charged for the length of time that the connection is maintained. The present invention provides for several options previously unavailable to e-mail clients aboard an aircraft through the use of customized software options. For example, the transfer of data attachment files may be refused by the passenger via a pre-selected criteria. The present invention allows passengers to initiate contact between the airborne server and the ground server to retrieve or send e-mail messages, and to get information regarding data transfer and costs.

The invention includes the feature whereby passenger information and server settings are sent to a central location for storage. The stored information can be loaded on a replacement server should the original server fail or need to be replaced. By sending the updated settings to the central location, a new server can be reconfigured by pre-loading the information from the old server's settings or the server can access the central location's storage and retrieve the necessary information automatically.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

DESCRIPTION OF THE PREFERRED EMBODIMENTS

Figure 1:
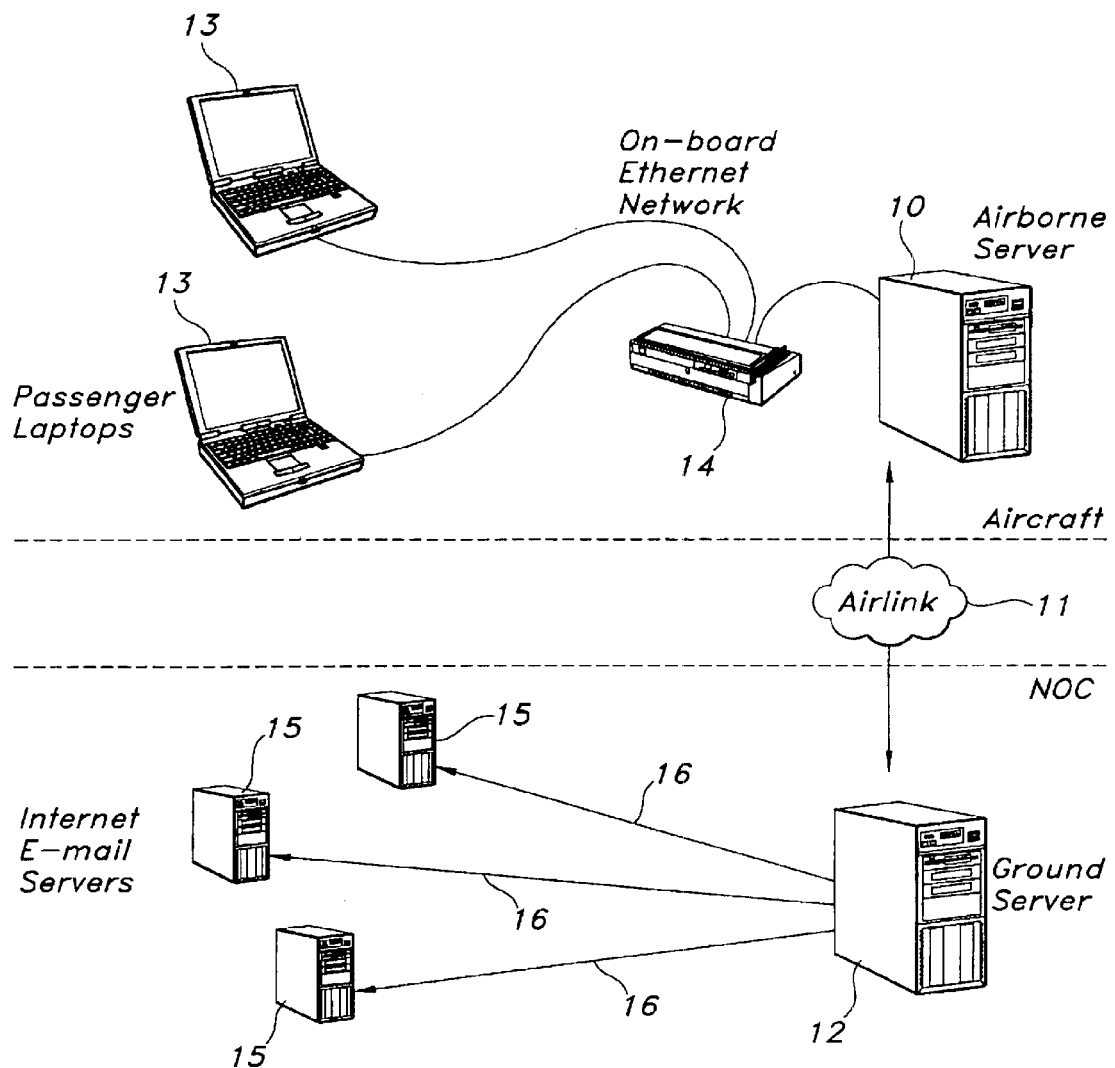
FIG. 1 illustrates the major hardware components of an air-to-ground electronic mail delivery system of the present invention.

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a system for delivering and retrieval electronic mail and electronically stored data from an aircraft in an efficient and flexible manner.

The e-mail retrieval and send system consists of three basic components: the airborne computer server 10, the air to ground communication link 11, and the ground computer server 12 located at an operations center. The airborne server 10 interacts directly with passengers' laptop computers 13, hand held computers, and any other computing devices equipped with an e-mail client software. The interaction between the passengers' computing devices and the airborne server is achieved via a local area network 14 on the aircraft. To retrieve e-mail messages from the aircraft, the passenger enters a command from his personal computing device (i.e., laptop, palm held device, or other portable computer) instructing the airborne server to retrieve e-mail messages from the passenger's e-mail service provider on the Internet. To send e-mail messages from the aircraft, the e-mail sent by passengers is relayed to Internet mail servers 15 through the airborne and ground servers via the air to ground communication link.

An important feature of the present invention is the data transfer protocol used to communicate data between the airborne server and the ground server. The mediation of the airborne server is required because of the transient and fragile nature of the air-to-ground communications link. The automated protocol can be varied to meet the needs of the particular client and alleviates the client from the burden of managing the data call. Since calls may not complete correctly, may terminate unexpectedly, and may reliably continue for only a few minutes, this call management can generate significant savings by avoiding unnecessary or repetitive data transfer.

Ordinary network e-mail protocols are designed for a robust connection, and do not resume where the communication left off when reconnecting after a partially completed data transfer operation. The present invention addresses the special needs of the aircraft passenger in view of the tenuous nature of the ground to air communications link. Thus, the modification of the airborne server with custom data transfer protocol and custom software-controlled call management can provide a more efficient system and allow the passenger to experience a more seamless and efficient e-mail experience.

FIG. 1 illustrates the basic hardware components. A plurality of computing devices 13 are connected via a local area network, or LAN 14, which in turn is connected to the airborne computer server 10. On the ground, a ground based server 12 is connected to a plurality of e-mail servers 15 on the internet 16 (represented by arrows). Between the airborne server and the ground based server is a communications link (or "airlink") 11 by which data is transferred from the aircraft to the ground and ground to aircraft. Examples of links to achieve the data transfer are radio telephones and satellite links.

The following section describes the architecture and data flow involved in retrieving mail while in flight. The process begins when an aircraft passenger wishes to check his or her e-mail account on a ground-based internet e-mail server to see whether the passenger has any messages. From the passenger's personal computing device, the passenger enters a command to establish a connection with the airborne server.

When the passenger first establishes a connection between the personal computing device and the airborne server, the airborne server sends a message to the passenger asking the passenger to enter a pre-established user login name and a user password corresponding to the passenger's e-mail account. The user login name, password, and an IP address of the personal computing device are stored on the airborne server for future reference. Although the airborne server has not verified the passenger's information as this point, the passenger's request for e-mail status is acknowledged by the airborne server as if the passenger has been authenticated successfully and there is no unread mail waiting. During this first connection with the passenger's personal computing device, the airborne server creates a "Welcome" mail message for the passenger and sends the Welcome message to the passenger. The Welcome message explains that mail will be retrieved during the next call to the ground.

The airborne server adds the passenger's user login and password to a list of passengers for which mail will be requested from the ground server during subsequent calls. During each call, the Request for Mail (REQM) command is sent periodically. During the call to the ground server, the passenger's login identification and password are delivered across the air-to-ground data link where they are received by the ground server. The ground server will typically host e-mail accounts for the passengers as a service for a nominal fee. In this case, the ground server will be pre-loaded with each passenger's user identification for authentication. The ground server verifies each user requesting mail, and returns an authentication acknowledgement for each. If the passenger does not have an e-mail account with the ground server host but rather a separate non-affiliated e-mail account, the ground server merely transmits the request and verification information to the appropriate internet server using known routing techniques. The non-affiliated e-mail account server verifies the passenger and forwards the mail and verification to the ground server. The ground server upon successful authentication surveys each passenger's e-mail account and determines the number of new messages waiting to be read. The ground server sends an acknowledgement to the airborne server across the air-to-ground data link verifying the user's login and password information, and the acknowledgement also contains the number of messages waiting in the user's ground server mailbox.

If the passenger has e-mail accounts with both the ground server host and an unaffiliated service provider, the airborne server can be set up to automatically substitute e-mail addresses from one account to the other such that the translation is invisible to the passenger. This allows a passenger with a company e-mail account, for example john.doe@mycompany.com and an account affiliated with the ground server provider, for example john.doe@Airlink.com, to retrieve and send e-mails from either account without reconfiguring the personal computing device. Whether connected to the company's lan or the airborne server, the client will be able to retrieve his emails using a predetermined mapping of the two accounts.

Before mail is transmitted across the air-to-ground data link to the airborne server, filtering may be executed according to the account options associated with each user's account. One possible filtering is of the e-mail messages themselves. Traditionally, all e-mail messages are transferred and the user selects the e-mail messages that he chooses to read. However, in the aircraft environment this requires that all e-mails be transferred across the data link, even if those e-mail messages are not read. This is an unnecessary cost which is avoided by the present invention. In one embodiment, a list of e-mail messages is delivered to the passenger and the passenger selects which messages are to be retrieved. The preselection of e-mails is a valuable feature of the present invention.

Another filtering feature comprises a stripping of any data files attached to the e-mail ("attachments"). Attachment filtering can optionally strip e-mail attachments above a pre-selected size threshold. That is, the ground server determines the size of the attachment accompanying an email to be read by a passenger, and if the attachment is greater than a pre-selected threshold, the e-mail message is communicated from the ground server to the airborne server without the attachment. Setting attachment stripping to off sends all attachments to the airborne server, and setting attachment stripping to on and the maximum size threshold to zero results in all attachments being stripped. In this way a user can manage the time and costs of transferring e-mail attachments before the attachments are delivered to the passenger.

Furthermore, when an attachment is stripped, the present invention provides for a universal resource locator, or "URL" to be generated and inserted at the beginning of the original mail message. The URL can be used by the passenger as a hyperlink to retrieve the stripped attachments. Here, the attachment is converted to a web page that can be accessed by a web browser program rather than transferred with the e-mail message. Another option for minimizing the data transferred across the data link is the stripping of e-mail headers prior to transmission. That is, before mail is forwarded to the airborne server, the user e-mail account options are checked to determine if e-mail headers should be removed from the message. If so, the headers are removed further reducing the amount of data transmitted across the air to ground link.

The mail traffic control (MTC) application on each passenger's computing device periodically updates its status for unread mail and indicates to the passenger when mail arrives. The e-mail client software on the passenger's personal computing device can also be configured to poll the airborne server for unread mail at periodic intervals. When mail is detected and the client wishes to retrieve the e-mail message, the ground server formats and sends an incoming mail command for each message to be forwarded to the airborne server.

As the airborne and ground servers first connect, the air-to-ground data link software establishes a new session. E-mail and attachments to be exchanged by the air and ground servers are compressed and formatted into data packages. A package may be any size depending on the system and capacities of the servers and the data link, from a few bytes to many megabytes. The data packages are then transmitted as a sequence of fixed quantities of data, or "frames." The frames are tracked in a database maintained by the ground server and the status of each frame is updated from "waiting" to "delivering" to "delivered." Should the connection of the data link be lost during transmission, the tracking of the frames ensures that each e-mail message will be delivered intact, and unnecessary retransmitting of data is avoided because previously transmitted frames are not resent. Also, packages in the queue waiting to be delivered can be prioritized or deleted by the passenger, and thus the most important messages and attachments can be transferred first.

After sending the e-mail messages to the airborne server, the ground server does not immediately delete the e-mail message from the passenger's account. Instead, when the passenger next checks for unread mail, the airborne server delivers the message to the passenger's computing device and deletes the message from the airborne server mailbox. If the user's e-mail client is configured to "leave mail on the ground server" the process is over. If not, the airborne server acknowledges receipt of the e-mail message by the passenger to the ground server and the ground server invokes the post office protocol (POP) to delete the e-mail message.

Once the passenger has connected to the airborne server, unread mail may be requested periodically from the ground server without user intervention. When the passenger connects again to the airborne server (by checking mail), the airborne server simply returns any unread messages to the passenger. As noted above, the airborne server then acknowledges message receipt to the ground server.

Figure 2:
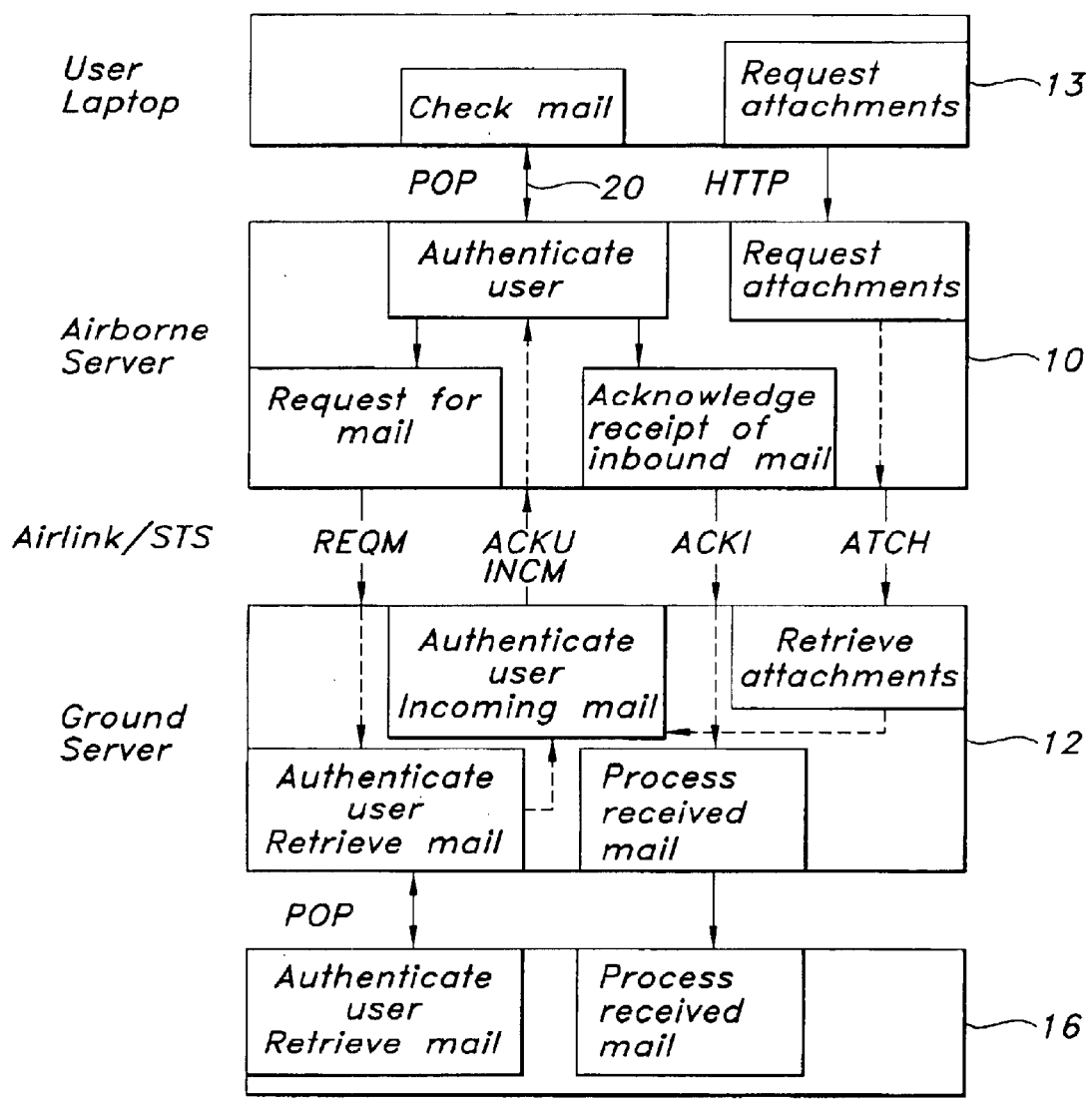
FIG. 2 is a block diagram of data flow from a passenger's computing device issuing a request for retrieving e-mail from an e-mail service provider.
Figure 3:
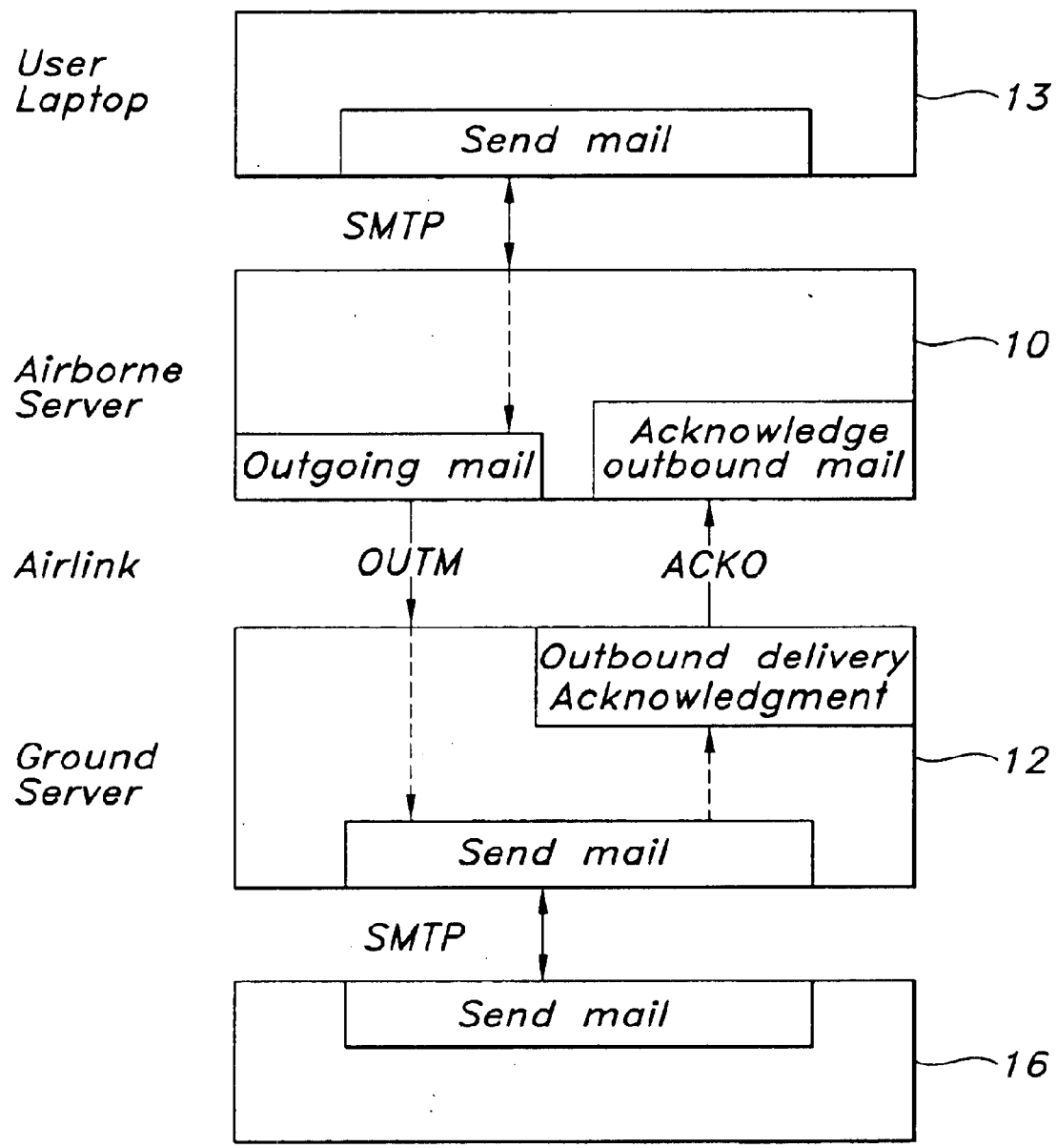
FIG. 3 is a block diagram of data flow from a passenger's computing device issuing a request to send e-mail to an e-mail service provider.

FIG. 2 illustrates the configuration between the passenger's computing device 13 and the client's e-mail service provider, or "postoffice" 16. The passenger via a computing device 13 sends an inquiry signified by an arrow 20 to the airborne server 10. The inquiry includes the user's logon identification and password as well as an IP address for the computing device. A message is returned to the user indicating that mail will be retrieved if available at the next call to the ground server. During the next connection between the airborne server 10 and the ground server 12, an authenticate user request (ACKO) is communicated from the airborne server to the ground server to the user's e-mail post office, along with a request to retrieve unread e-mail (REQM). The authenticate request is approved or denied by the post office and, assuming approval, is communicated back to the ground server along with the unread email messages. During the next air to ground link, the authenticate request approval (ACKU) and the e-mail messages (INCM) are delivered to the airborne server according to the pre-selected criteria for delivery of the e-mail attachments. The airborne server sends an acknowledgement (ACKI) to the ground server that the mail has been received by the airborne server and, if so desired, the post office via the ground server can be notified that the e-mail has been delivered and read.

Where the e-mail attachments have been stripped according to the pre-selected criteria, the passenger can retrieve mail attachments by viewing an automatically generated HML page delivered to the airborne server using the request attachments (ATCH) option. The passenger's computing device sends a request to retrieve the attachments by providing a URL automatically generated by the ground server where the attachment can be viewed. The passenger upon viewing the HML page, can "click" on any or all attachments and send the instruction to the airborne server for execution. On the next call to the ground server, the requested attachments will be downloaded along with the original e-mail message for viewing by the passenger. Mail can be sent by the passenger in a similar manner to that used to retrieve the e-mail. Referring to FIG. 3, when the user first establishes a simple mail transfer protocol (SMTP) connection to the airborne server 10 (by sending an e-mail), the IP address of the user's computing device will be matched against the IP address associated with the last post office protocol (POP) login from that address. This POP user login will be associated with all outgoing mail in the SMTP session. This technique assumes that all e-mail clients are implementing a "check before send" server connection approach. When the passenger's e-mail client software sends an email message, it is packaged into an outgoing mail request (OUTM) at the airborne server and sent to the ground server 12 during the next call. The ground server acknowledges (ACKO) that it received the message and that the destination address is resolvable. It then forwards the message on to the recipient via the internet e-mail servers.

Figure 4:
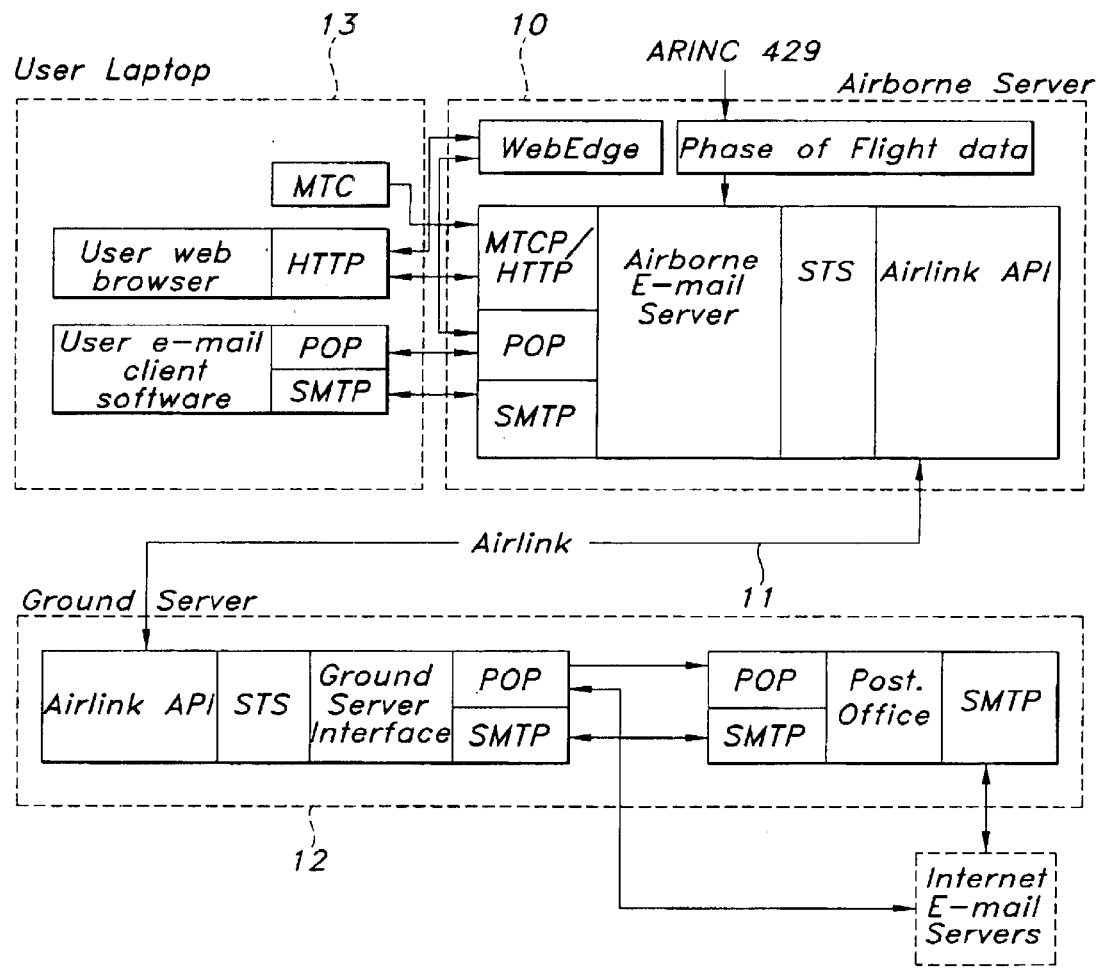
FIG. 4 is a block diagram showing the airborne server protocol interactions.

As illustrated in FIG. 4, the airborne server 10 interacts with multiple external components using a variety of protocols. For example, the user's e-mail client software operates using both POP and SMTP protocols. The ground server communicates with the airborne server via the STS air-to-ground communications link using the specially designed airlink protocol. The mail traffic control, an application that runs on the passenger's computing device to report on the status of mail transactions and is further used to start and stop air-to-ground data calls, uses a protocol referred to as mail traffic control protocol (MTCP). Additionally, the airborne server interfaces with the avionics to read phase of flight data (ARINC) so that the airborne server will be able to perform tasks according to the phase of the flight. The airborne server also interfaces with the user's web browser using the hypertext transfer protocol (HTTP).

POP is one of the standard protocols by which e-mail client software retrieves mail messages from an e-mail server. The airborne server supports POP for on-board e-mail users. The general role of a POP server is to act as a holding area for a user's messages, and to allow the user to access those messages after authenticating the user's identity with a login ID and password.

Although it appears to the user software as a POP server, the airborne server is in reality a local mail cache. The "real" POP server for the e-mail accounts is the ground-based e-mail server. The overall effect is that a user will not see unread e-mail immediately upon connecting to the airborne server, as the user's identifying information must first be sent to the ground server for authentication, and mail transferred up to the aircraft.

SMTP is the standard protocol used to send e-mail. The e-mail client software passes the mail message to an SMTP server, which then forwards the message on to the destination server. The recipient may retrieve the mail from the destination server using the POP protocol. The airborne server supports SMTP for on-board e-mail users. It functions as the ground-based e-mail server using software running on the airborne network. SMTP requests to send mail will then be relayed on to the ground-based server where they may be handled normally.

HTTP is the standard protocol by which internet web page content is retrieved by web browser software. The airborne server provides a custom HTTP server to support local web pages that list attachments for mail messages that have been stripped of attachments, as well as more well established internet interface software.

The airborne server to ground server (STS) protocol consists of commands that are sent from the airborne server to the ground server and vice-versa via the air-to-ground data link. Each command is a "package" that contains the request for a specific action, along with any required data. With one exception, each command is supported by only one of the two servers. In other words, a command may be an airborne server command or a ground server command. Some commands are responses to other commands. These response commands are not sent synchronously, but only when the requested action has been completed. This asynchronous response allows commands to be sent continuously without waiting for a response between commands. All STS commands are preferably formatted as text.

The MTCP protocol is the mechanism through which the MTC application communicates call management and statistics requests to the airborne e-mail server. All of the commands in the protocol are initiated by the passenger's computing device. The server side of the protocol consists entirely of command acknowledgements. Unlike the STS protocol, the MTCP protocol is synchronous—the client must wait for an acknowledgment before issuing the next command.

The airborne server acts as an intermediary between the passenger's e-mail client software and the passengers' ground-based SMTP and POP server. From the user's perspective, the airborne server appears as both SMTP and POP servers. The airborne server responds to SMTP (send) and POP (retrieve) commands from user email software, and communicates with the ground-based server to perform the actual e-mail retrieval and delivery. The ground server is the actual SMTP server for outbound mail.

The airborne server supports on-board POP clients to retrieve mail from the passenger's e-mail accounts, and supports on-board SMTP clients to send mail to recipients at arbitrary destinations. The server can also reject all mail retrieval and mail transmission attempts from unauthenticated users (e.g. users without authorized accounts), and receive and cache passenger mail from the ground server. Another useful feature, described more fully below, is a call management function to provide timely and efficient data transfer between the airborne server and the ground server. The airborne server provides a status to on-board MTC clients and responds to MTC requests (initiating or stopping a call, obtaining statistics).

The airborne server will initiate air-to-ground calls as necessary to periodically send and receive mail. Passengers may also initiate and terminate calls interactively from his or her personal computing device through the Mail Traffic Control program. This program communicates with the airborne server through the custom MTC protocol (MTCP). The airborne server program includes an MTC module which the e-mail software and MTC clients both use to manage calls. The air-to-ground communication link application programming interface (API) provides the actual mechanisms for controlling calls and reporting their status.

Figure 5:
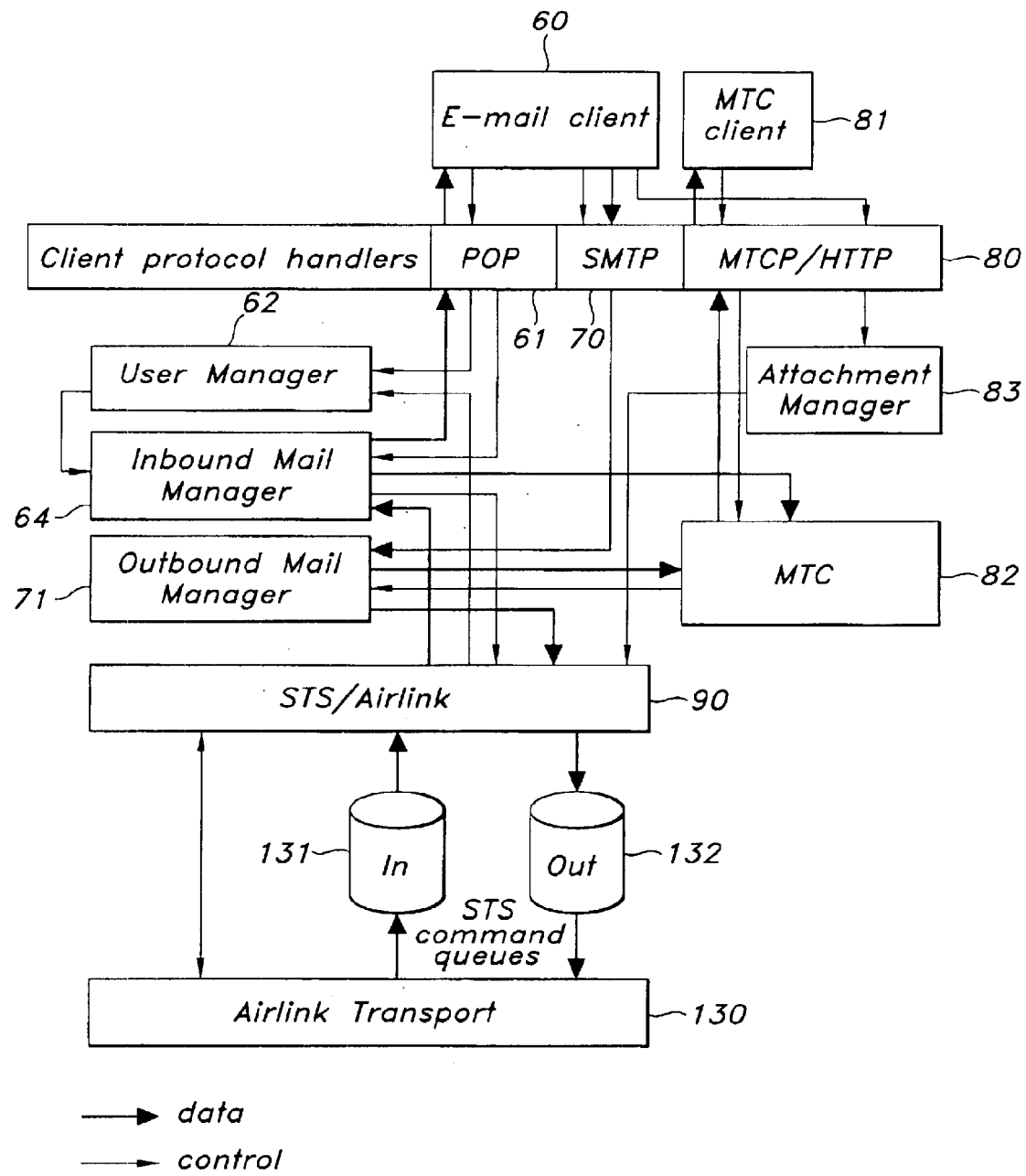
FIG. 5 is a block diagram of data flow into and out of the airborne server.

FIG. 5 is a schematic diagram of the functions of the airborne server. Each of the functional components shown in FIG. 5 are described in more detail in the following sections.

Figure 6:
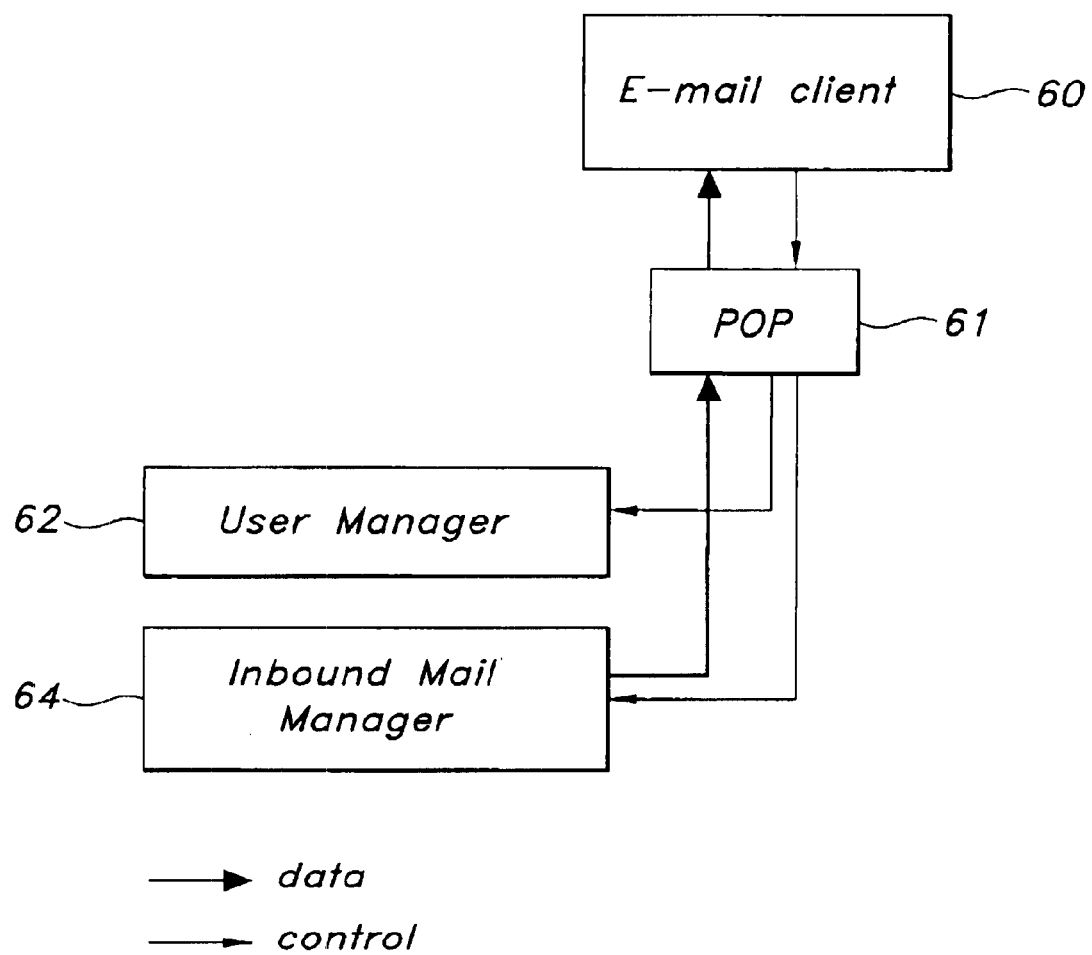
FIG. 6 is a block diagram of the POP protocol.

FIG. 6 shows the POP Protocol Handler function. The POP protocol handler 61 services requests from on-board e-mail clients 60, providing access to e-mail that they have requested while in flight. The POP handler accepts requests to authenticate a user, to retrieve mail, and to delete previously read mail. The POP handler forwards authentication requests to the user manager 62. The user manager returns the current user authentication status to the protocol handler, which provides an immediate acknowledgement to the POP client. At the time that authentication requests are received, the POP handler also caches the IP address of the user's computing device in the user manager. When a request is received for mail or mail statistics, the POP handler queries the inbound mail manager and returns the appropriate information to the passenger. For mail deletion requests the handler forwards deletion requests to the inbound mail manager 64.

Figure 7:
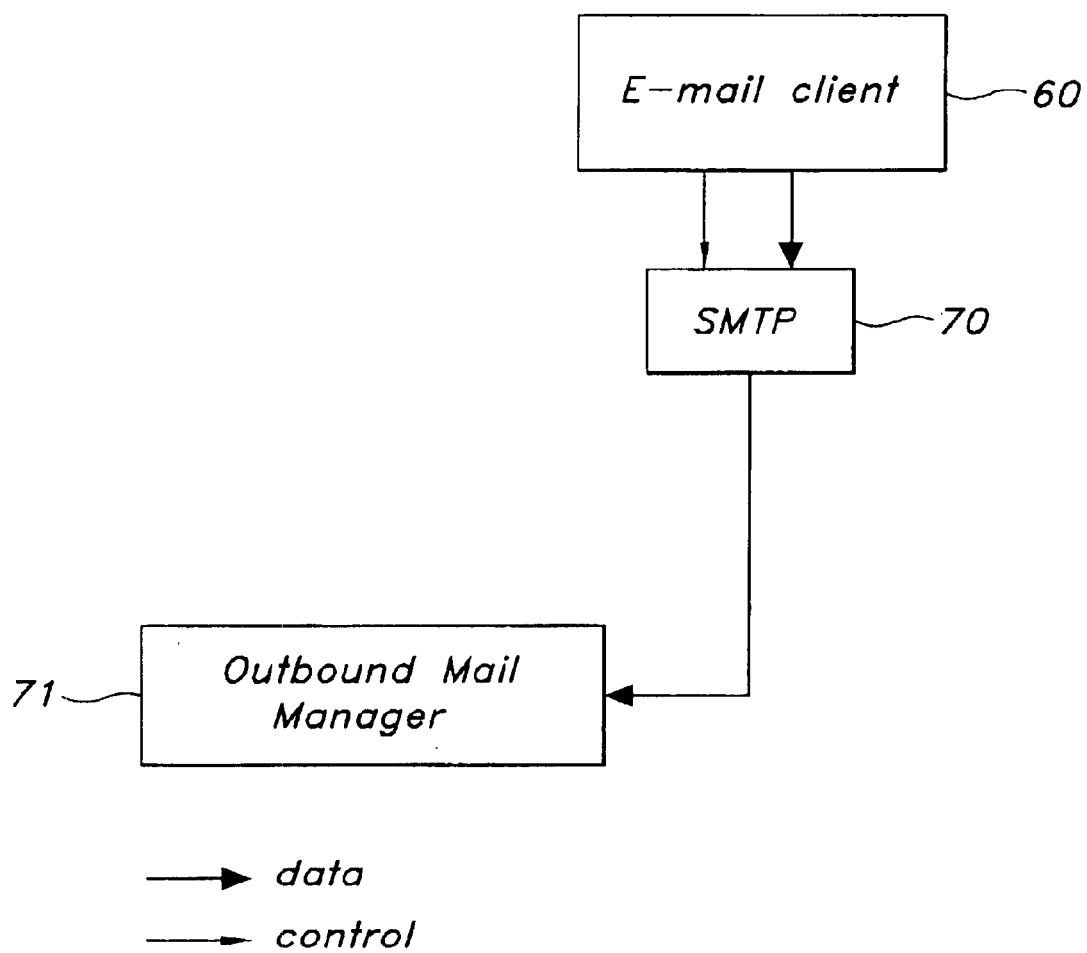
FIG. 7 is a block diagram of the SMPT protocol.

FIG. 7 illustrates the SMTP protocol handler 70 which services requests from passengers, allowing the passengers to send mail while in flight. The SMTP handler 70 accepts client commands, assembles the resulting outbound messages, and forwards them to the outbound mail manager 71.

Figure 8:
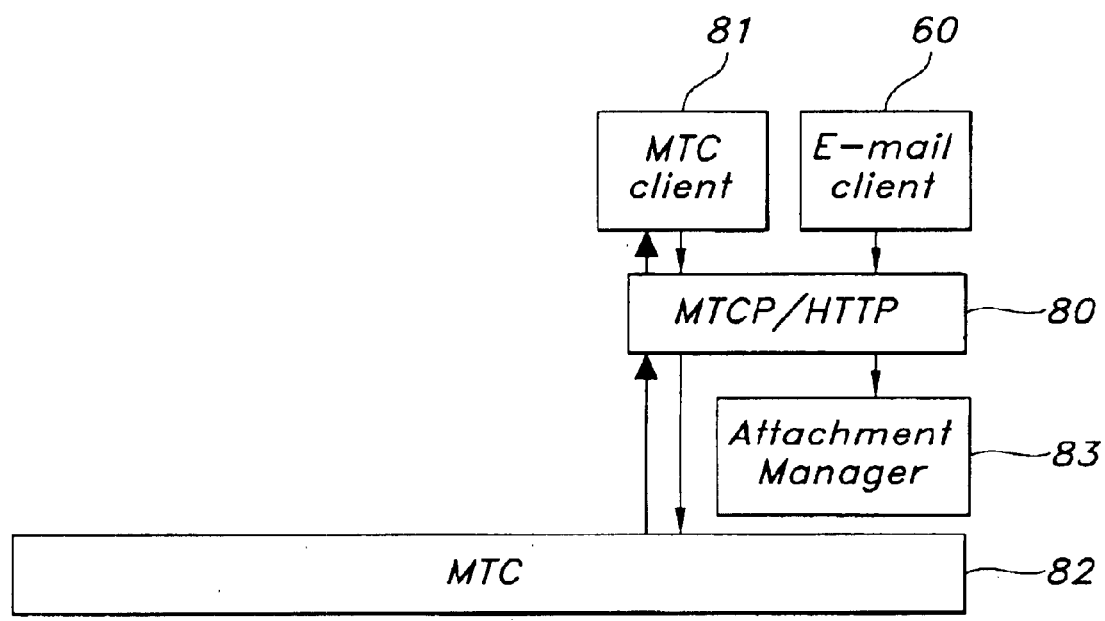
FIG. 8 is a block diagram of MTCP/HTTP protocol.

FIG. 8 illustrates the MTCP/HTTP handler 80 which accepts commands from the MTC client application 81 and from web browsers. The MTCP is based on hypertext transfer protocol, or "HTTP." Both protocols are serviced on a nonstandard HTTP port. The MTC commands may request an action from the air-to-ground communication link or may request e-mail statistics. HTTP requests are for dynamic web pages that list stripped mail attachments. The handler forwards all MTCP requests to the MTC component 82, and returns the results to the MTC client. Requests for URLs containing an attachment query string are forwarded to the attachment manager 83. The attachment manager creates a web page and returns it to the HTTP handler. The handler then returns the page to the client application. An email client is shown calling the HTTP handler instead of a web browser. While either option is available, a preferred method involves the user clicking on a URL that is embedded in an e-mail message. This action would invoke the browser to view the attachment web page.

Figure 9:
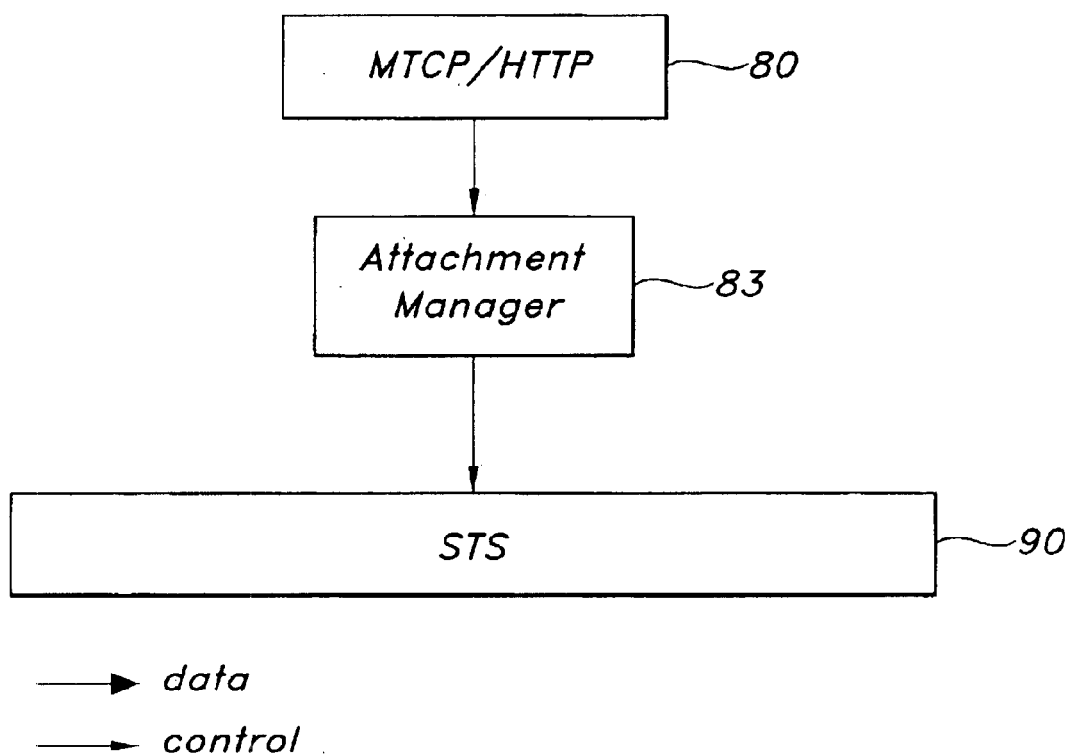
FIG. 9 is a block diagram of an attachment manager protocol.

The attachment manager shown in FIG. 9 accepts URL query strings from the HTTP protocol handler, and creates corresponding web pages to allow a user to select stripped attachments for retrieval. Two types of queries are supported. The primary query is to list the attachments for a single message. The secondary query is to submit a list of attachments for retrieval. When a primary query is received, a web page is constructed to list the attachments for the message. The message ID and attachment descriptions are contained in the URL provided. The web page is returned to the MTCP/HTTP handler 80. When a secondary request is received, a function in the STS 90 is called to format a request for attachments command and send it to the ground server.

Figure 10:
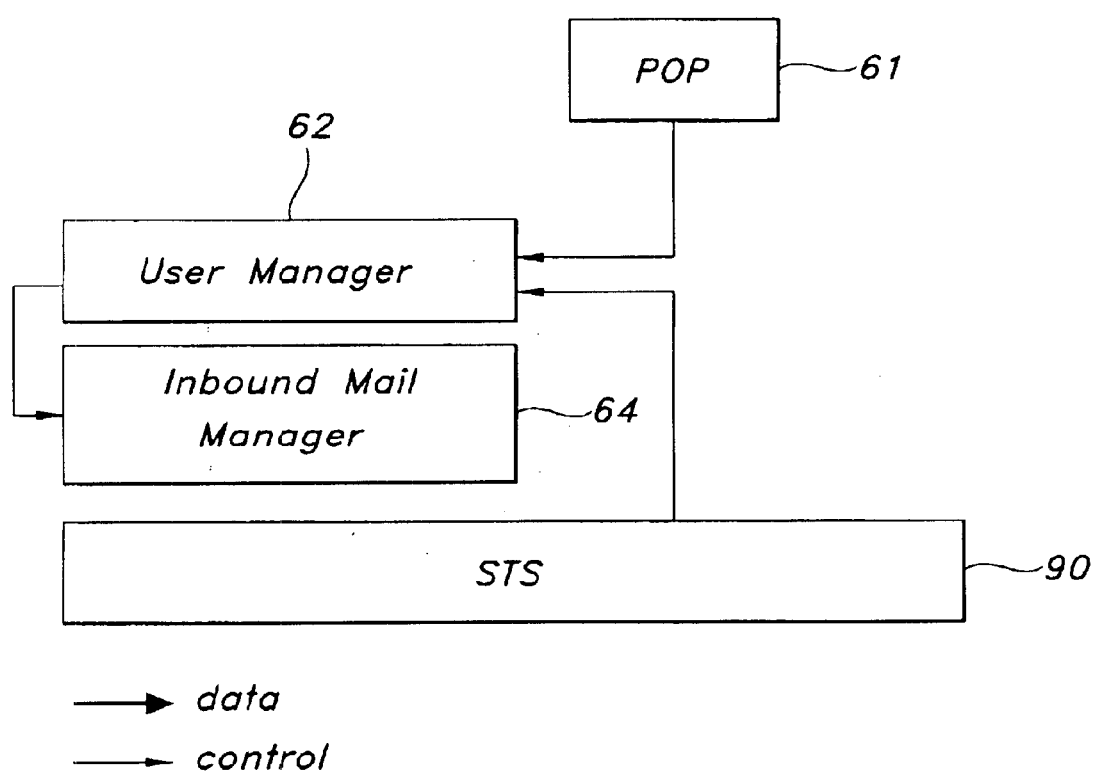
FIG. 10 is a block diagram of a user manager protocol.

The user manager component shown in FIG. 10 provides facilities for adding, changing, deleting, and reporting the status of user entities. The component manages a list of users and their authentication status. Initially, the user list is empty. Authentication requests are received from the POP protocol handler and processed locally by returning the current user authentication status. During the initial authentication request, the user identification does not yet exist. A new user entity is created with an unknown authentication status. This initial authentication request is answered affirmatively to the protocol handler, as if the user ID and password successfully matched a user entity. During this first connection, the user manager calls the inbound mail manager to create a Welcome mail message for the user. The Welcome message explains that mail is being retrieved, and may not be shown in the e-mail client software for some time.

Figure 11:
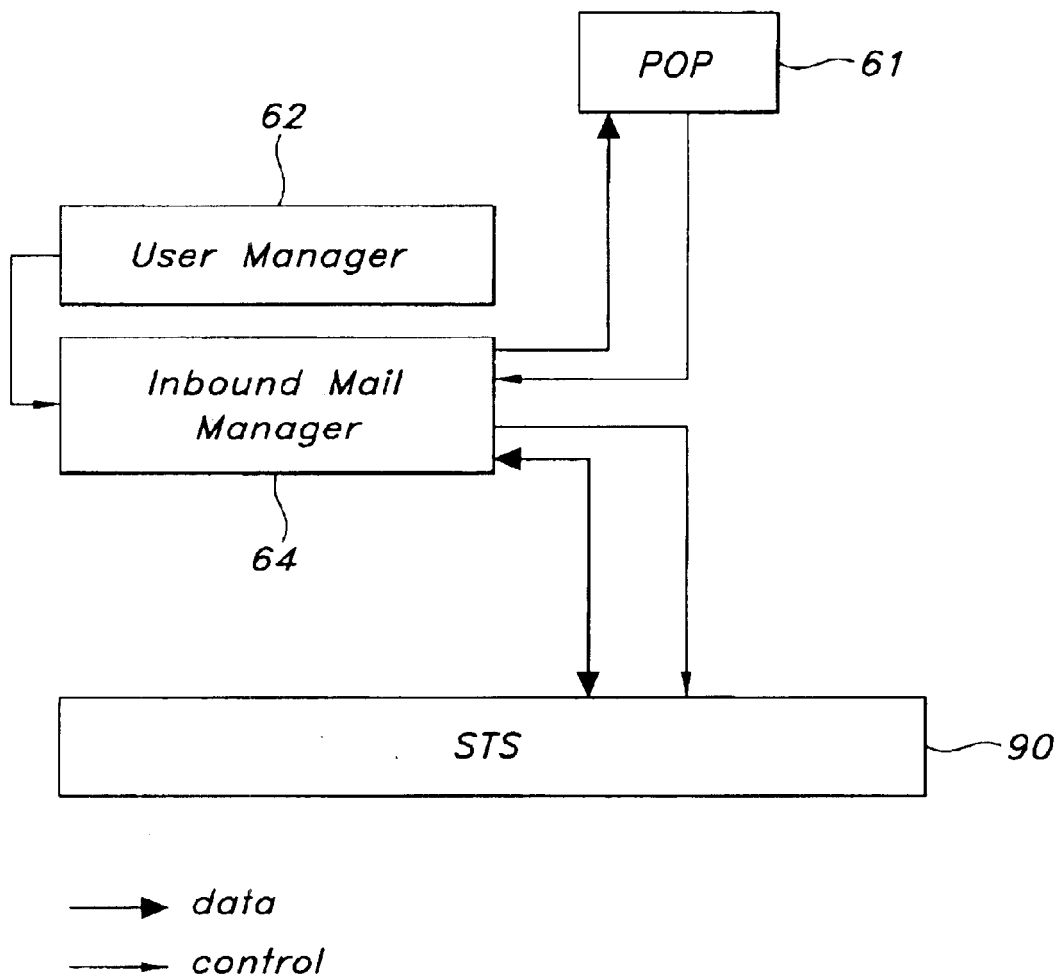
FIG. 11 is a block diagram of an inbound mail manager protocol.

FIG. 11 illustrates the inbound mail manager. The inbound mail manager caches the mail messages received for the passengers of the aircraft. It is accessible through the POP protocol handler. The mail manager maintains a unique ID for each message that persists for the duration of the flight. The mail manager accepts requests from the POP handler to retrieve messages, delete messages, and to provide statistics about messages. All of these requests are handled locally. When the protocol handler retrieves a message from the mail manager, the mail manager also issues a request to the STS to acknowledge inbound delivery back to the ground server.

When requested by the user manager, the inbound mail manager creates a Welcome message for new users. The mail manager also provides the MTC component with statistics on per-user unread message counts as requested.

Figure 12:
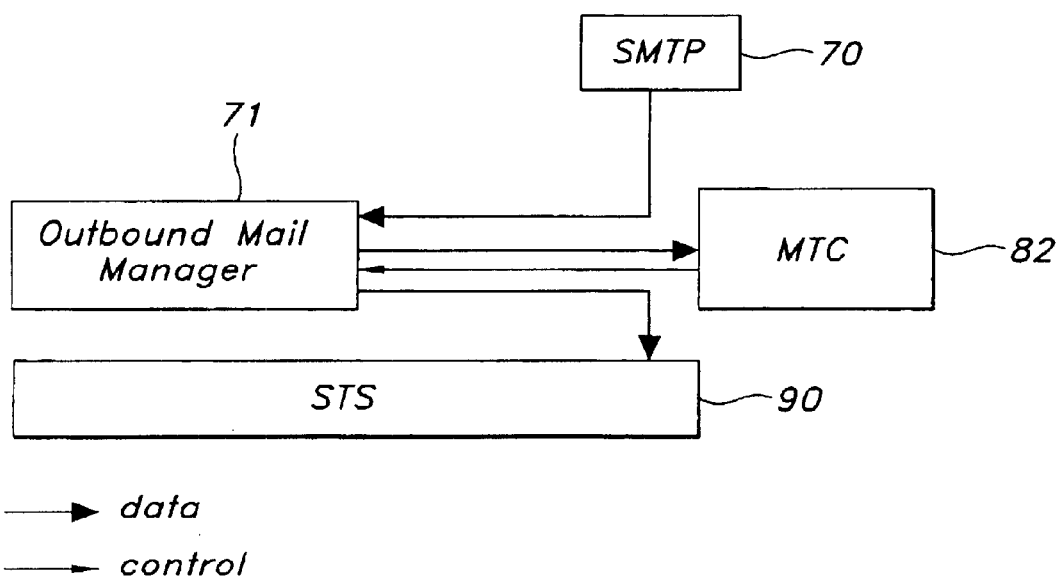
FIG. 12 is a block diagram of an outboard mail manager protocol.

FIG. 12 shows the outbound mail manager. The outbound mail manager contains basic information about each message sent by on-board users during the flight. The data stored for each message includes the delivery status, sender, recipient list, subject, size, and date sent. This data is maintained for use by the MTC in reporting message delivery status to on-board users. The mail manager maintains a list of outbound messages. After receiving a message from the protocol handler, the mail manager adds the entire message to its internal list. After the sender has been authenticated, the mail manager forwards the message to the STS for delivery. After the STS has accepted each message for transmission, the mail manager removes the body of the message from its internal list, retaining only basic information about the message. This basic information includes delivery status, sender, recipient list, subject, and date and time sent.

The mail manager provides the MTC with this message information as requested. The MTC also updates the message delivery status as the message transits the various stages of delivery. The stages reflected in the mail list are Queued, Transferring, Interrupted, and Sent.

Figure 13:
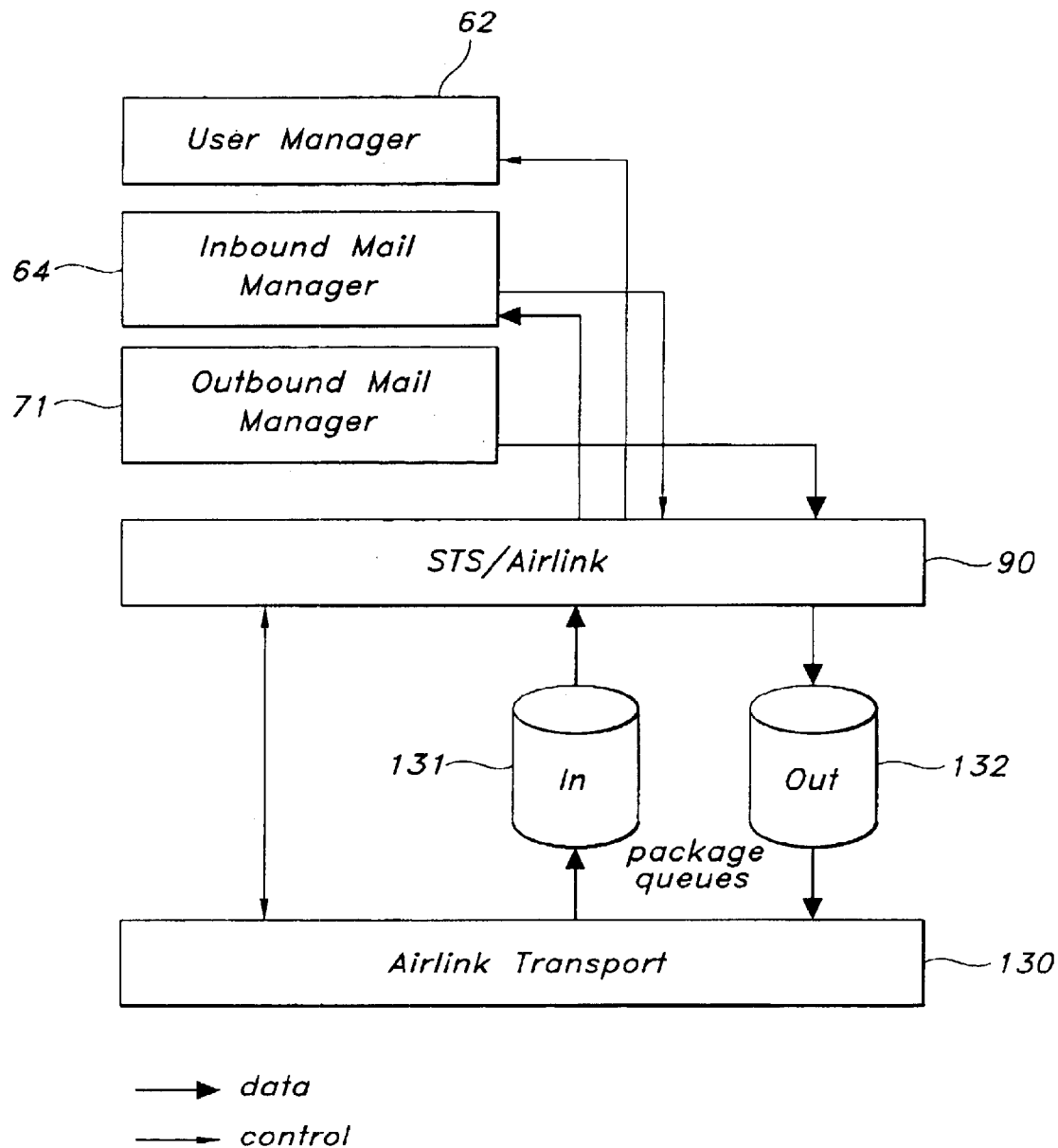
FIG. 13 is a block diagram of a protocol between an airborne server and communication link.

FIG. 13 schematically shows the STS. The STS component implements the Server-To-Server protocol. It translates requests from the higher levels of the airborne server into commands for the ground-based e-mail server. It decodes commands and responses from the ground server, and takes appropriate action using the other facilities of the airborne server. All interaction with the higher levels of the airborne server is asynchronous. The server management components make requests of the STS, which returns control immediately, and reports the results at some later time.

The STS periodically reads the list of users supplied by the user manager and formats a corresponding Request for Mail message for the ground server. This command is added to the outbound STS 130 command queue whenever the STS is notified that a link has been established. When the STS receives authentication responses to the request for mail, it updates the user manager with the current authentication state of each user.

When inbound mail 131 is received by the STS, it is passed on to the inbound mail manager. When a passenger retrieves the message, the inbound mail manager notifies the STS. The STS then formats an Inbound Delivery Acknowledgement and adds it to the outbound STS command queue. The outbound mail manager sends outgoing mail to the STS. In response, the STS formats an Outgoing Mail message 132 and adds it to the outbound STS command queue. The STS also manages a thread to poll the incoming queue. When a command package arrives in the inbound queue, STS removes it and dispatches it to the proper command handler.

The airborne STS manager manages a thread that provides checking for the connect criteria. When the prescribed criteria are met, a connection with the ground server is initiated. Connection criteria are, for example, 1) outgoing packages queued, 2) new user present, and 3) a minimum amount of time elapsed since the last call was terminated. These criteria are adjustable via the airborne server's preference web pages.

The airborne STS manager also manages a thread that provides checking for the disconnect criteria. When the prescribed criteria are met, the current connection to the ground server is terminated. Disconnect criteria are, for example, 1) both outgoing and incoming data transmitted, and 2) a minimum connect time has elapsed since the connection was initiated. These criteria are also adjustable via the airborne server's preference web pages.

Figure 14:
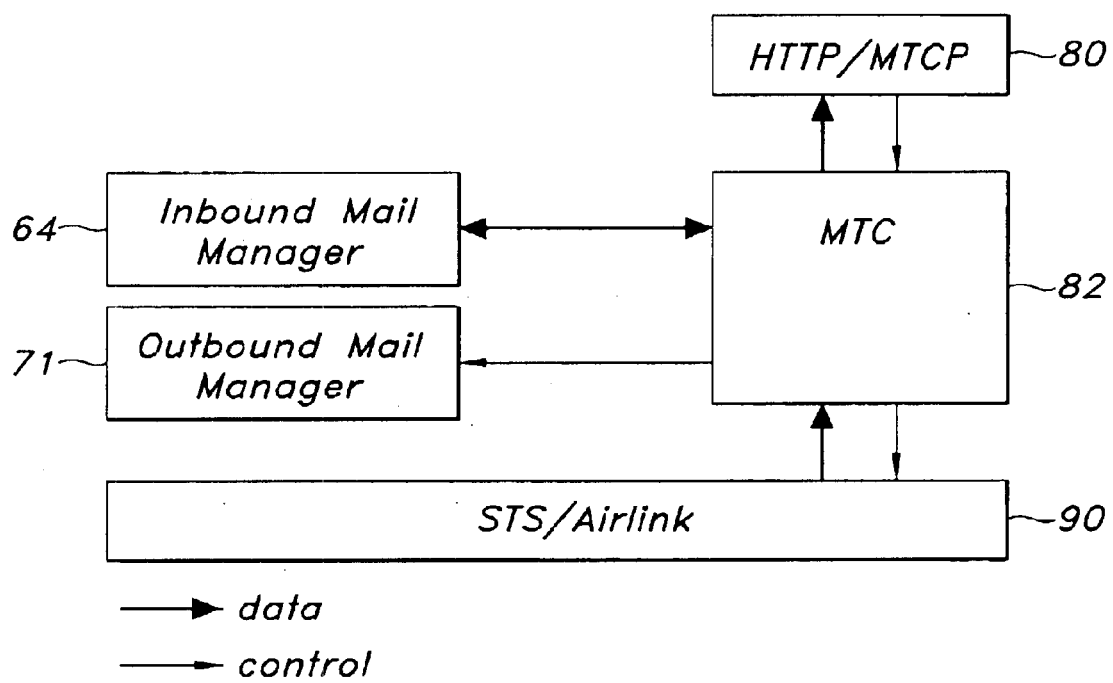
FIG. 14 is a block diagram of a protocol for managing call data.

FIG. 14 shows the MTC component, which acquires communication and mail statistics for the user to retrieve via the MTC client application. The MTC initiates and terminates calls using the air-to-ground communication link API when requested by the MTCP protocol handler. A call may also be established from the ground. As data is sent and received through the airborne mail server, the MTC records the following communications statistics for each airborne user: total bytes sent, total bytes received, total messages sent, and total messages received.

The MTC answers requests for statistics from the MTC protocol handler. In response, it provides a snapshot of the current statistics. A statistics-gathering thread in the MTC periodically polls the inbound and outbound mail managers for message information. The information obtained from the mail managers includes the unread inbound message count and the status of outbound messages. The statistics thread also requests statistics from the air-to-ground communication link. The air-to-ground link provides the total airtime statistic to the MTC.

The airborne server is designed to be stateless between power cycles, so that (a) no user initiated "clean up"

operation is required at the beginning of each flight, and (b) the server can recover gracefully from in-flight power failures. When the airborne server program is started, all cached mail and internal data structures will be deleted. The one exception to this is packages cached by the air-to-ground communication link for transmission to the ground (transmission will be completed when the server is re-started). This feature is controlled by the 'persistent' package attribute.

If power is lost in-flight, passengers using the system are not required to re-boot their computing devices or perform any other operation to recover. The only indication to passengers of a power cycle will be a new welcome message in each passenger's inbox the next time they check mail.

The airborne server relies on an underlying link layer to handle the transport of all information across the air to ground radiotelephone or satellite physical layer. The link layer will isolate the air and ground servers from the details involved in sending data across an arbitrary physical medium. The link layer may consist of one or more physical links, i.e., radio telephone, satellite, IEEE 802.1 1, etc.

The high-level air-to-ground link layer handles usage by multiple subsystems. The air-to-ground link allows subsystems to identify themselves to the link layer, allows senders of packages to designate the receiving subsystem, and routes packages as requested to the destination subsystem. In a preferred embodiment the air-to-ground link is designed to support different types of data transport mechanisms. The air-to-ground link is responsible for initiating calls from the aircraft, and retrying calls when the connection is halted. The link resumes the transmission of a data package after a connection has been halted with a minimum resending of data, and provides sequencing for all packages sent, so that packages sent are delivered in the order that they were sent. The air-to-ground link is designed to assure delivery of all bytes in a data package and provide data compression and encryption prior to transfer.

The application programming interface (API) for the air-to-ground link permits a variety of functions available to the passenger. If the passenger does not want any calls to be initiated, the API blocks the calls. If the passenger wishes to resume calls, the unblock command will allow calls to be made. The passenger can also disconnect a call freeing up a physical link as well as initiate a call to the ground server. The API can discern how many packages are waiting in the incoming queue and allow the passenger to get a package from the queue. The passenger can also send packages of data to the air-to-ground link and the API will assign a unique identifier to the package for tracking. Additionally, the passenger can query the API about the status of a package.

The API for the air-to-ground link keeps track of statistics on the data transfer, such as packages transferred, total number of bytes transferred, and total call time. These statistics are readily available to the passenger via the API. The passenger can also inquire about the call status, whether a call is in progress and how long, or when the next call will be initiated.

Figure 15:
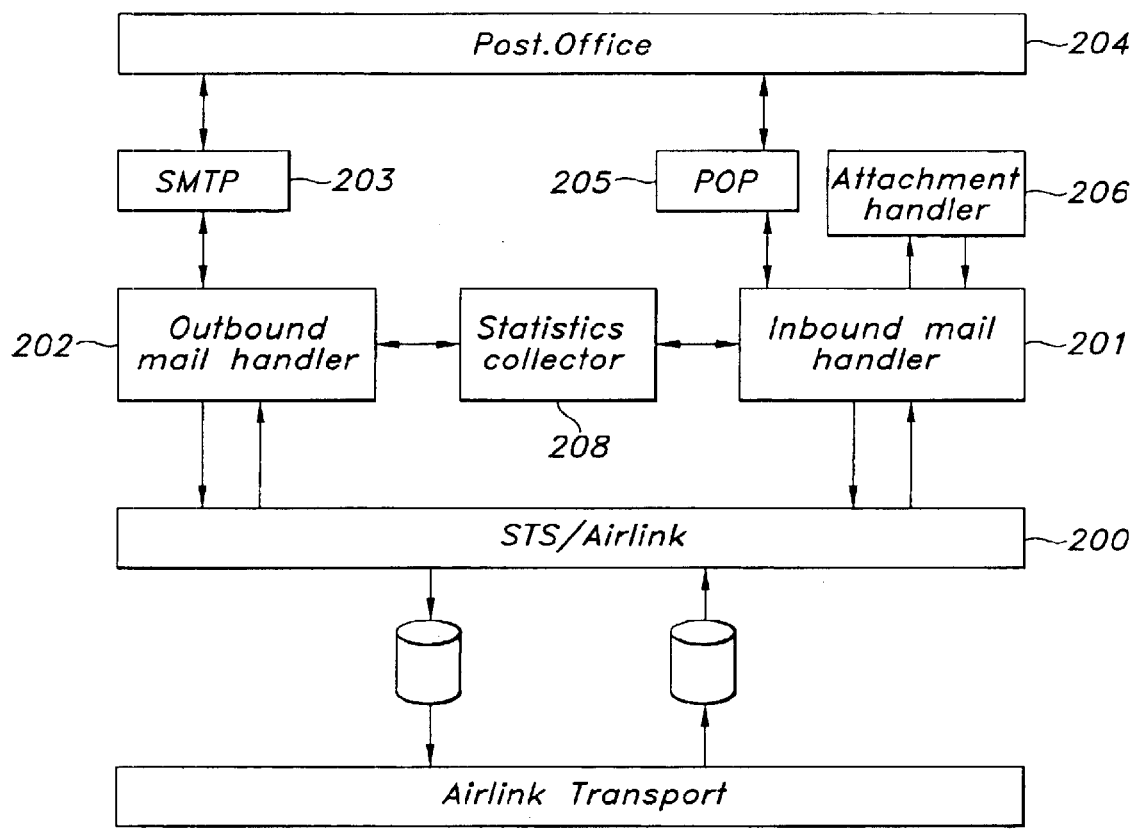
FIG. 15 is a block diagram of a protocol between a ground server and communication link.

FIG. 15 illustrates the Ground Server-To-Server (STS). The STS protocol handles: translation of data received from the airborne server via Airlink into commands to be handled by the ground server, and data to be transferred from the ground server to the airborne server. Communication between the STS and components of the ground server is handled asynchronously. The STS receives the following commands from the inbound command queue (from the an airborne server): to retrieve mail, to retrieve attachments, inbound delivery acknowledgement, and to send mail.

When a request to retrieve mail or attachments for a user is retrieved by STS 200, the request is passed along to the inbound mail handler 201. After retrieval is complete, the messages are returned to the STS and added to the outbound command queue. Notification of inbound delivery acknowledgement is sent from the airborne server after a user has retrieved mail sent in response to the request for mail command. The acknowledgement is relayed to the inbound mail handler 201. No response is returned from the ground server to the airborne server. The above scenario only occurs when the airborne user has the "leave mail on the server" feature in their email client turned off. Requests to send mail are retrieved from the inbound command queue and relayed to the outbound mail handler 202.

The outbound mail handler 202 receives messages from the STS 200, which are then passed onto Post Office SMTP server 203 for mailing. An SMTP connection is initiated with Post Office 204 and the mail message received from the a airborne server is sent. After mail has been successfully sent, the STS is notified with an outbound delivery acknowledgement. If the mail cannot be successfully passed to the SMTP server 203, the outbound delivery acknowledgement indicates this.

Mail and attachment requests received by the STS are forwarded to the inbound mail handler 201. All requests initialize a POP connection 205 with Post Office 204. When a request for mail is received, first the username and password are authenticated, and then the mail is retrieved. This may result in one or more commands being presented to the STS 200 for transmission to the airborne server. First an authentication acknowledgement with a tri-state (authentic, unknown user, invalid password) result is relayed, along with the number of messages that will be retrieved. If the user authentication passed and there is mail to be retrieved, then a separate incoming mail command is generated and passed to the STS 200 for each mail message retrieved from Post Office 204. Before a newly retrieved mail message is passed on to the STS, the attachment handler processes it. After processing, it is returned to the incoming mail handler 201 and passed to the STS 200. A request to retrieve an attachment is passed directly to the attachment handler 206 for processing. The inbound mail handler 201 retains certain information about the mail messages retrieved. This includes the following: unique package id (from the Airlink), user ID for the mail message (from the POP server), login name associated with the message, date and time received, user preferences (for attachment handling), and system id. This information is retained until the mail handler receives an inbound delivery acknowledgement from the STS. When the acknowledgement is received, a POP connection is again initialized with Post Office 204 to delete the user's email message from the email server. After that time, the retained information is deleted from the inbound mail handler 201. This only happens in the case that the user has their email client set to remove mail from the server ("leave mail on the server" turned off). Otherwise a discard collection thread runs and periodically clears out old mail message information (the timeout value for this discard collection is modified in the ground server preferences).

The attachment handler 206 receives two types of messages from the inbound mail handler 201: request for mail and request for attachments. When mail is being requested, the attachment handler 206 scans each incoming mail message for attachments and processes them according to the user preferences that have been set users can set preferences to either strip or pass through attachments, where if attachment stripping is turned on, a minimum size threshold is defined above which the attachment is stripped. When attachments greater than N bytes are stripped, each attachment is replaced with a text description of the attachment. This description is inserted directly into the body of the original mail message. The value of N is initially set to 0, which will remove all attachments. The user may change this value in his preferences.

In addition to the text descriptions, the attachment handler 206 generates and appends a URL to the end of the email message. The URL is a link to the airborne HTTP server/port and includes information about the email and its attachments in the form of a query string. The attachment retrieval URL contains the following pieces of information: the user's login name, the number of attachments and for each attachment the type of the attachment, the file name and the file size.

To retrieve an attachment, the user clicks on the URL in their mail message. The request is passed to the Airborne HTTP Server. The URL is parsed and a HTML page listing the attachments is dynamically created and returned to the user. From the user's browser, they can select which attachments they would like to retrieve and then press the Retrieve button. The request is passed back to the Airborne HTTP Server, which formats a request for attachment command to be forwarded through the STS, and retrieved by the ground server. The HTTP Server will send a return confirmation HTML page to the user letting the user know that the attachment is being delivered. Information for stripped attachments is maintained on the ground server. This information includes: Username, Unique package id, and user ID (from the POP server) for later retrieval of the original message.

A Request for Attachment command is passed to the attachment handler from he inbound mail handler. These messages are selectively stripped of attachments. Only the attachments specified in the request for attachment command are kept in the original mail message. This mail message is then passed back to the inbound mail handler and forwarded through the STS to the airborne server. If the user's preferences indicate that attachments are never to be removed, no processing is required by the attachment handler.

The statistics collector 208 interfaces with both the inbound and outbound mail handlers. The following data will be tracked for each user: total bytes sent, total bytes received, total messages sent, and total messages received.

To facilitate prioritizing data transmission over the Airlink, the package data container and the package queue may be extended to include a priority field. The priority value of a package can be assigned by its creator and will be honored when inserting the package into a queue.

For users with a high volume of incoming mail, it would be useful to transfer only the header information of incoming messages to the passenger. In a preferred embodiment these headers are packaged as a single mail message and displayed to the user as a form. The user requests delivery of the actual messages by replying with the form and selecting the messages of interest in the form.

Another difficulty with aircraft e-mail systems is problems associated with replacing an airborne server with a new server. Complex avionics or electronics systems such as the cabin file server must be configured with various information such as aircraft tail number, customer name, equipment interfaces, phone numbers, and the like before being used on an aircraft. The initiation of the first server is inevitable, but heretofore subsequent servers similarly had to be initiated as though it were the first server. This is time consuming process which may require special tools and software available only to the initial installer. However, the present invention overcomes the above identified problem by sending the latest information on the server via e-mail to a storage location of a service provider for later use. Each time a client setting is changed, or information on the initial configuration is amended, the changes are sent to the storage location. The service provider keeps a database of the most recent configurations for each unit, and this configuration can easily be preloaded onto the replacement unit. This avoids the need for the costly and time consuming reinstallation of the configuration for a replacement server.

Alternatively, the stored configuration data could be used to automatically configure a new server. In this case, a new cabin file server upon initial installation would recognize that it has never been configured and would be programed to call the storage location at the service provider. The new server would be provided with the last stored configuration for the previous airborne server on that aircraft. This requires only that the mechanic enter into the new server basic aircraft information such as tail number or customer name, and the remaining information for the complete configuration would be automatically retrieved electronically.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An improved data retrieval and transmission system for use aboard an aircraft comprising an airborne server connected to at least one passenger's computing device, and ground based server, and a means for exchanging data between the airborne server and the ground based server, the improvement comprising:

means on the ground based server for converting data to be transferred between the airborne server and the ground based server to a plurality of sequenced frames, where the ground based server maintains a delivery status of each frame in the sequence;

where the ground based server, upon interruption of the means for exchanging data during transmission of a sequence of frames, transmits only frames having a status of not already having been delivered.

2. The improved data retrieval and transmission system of claim 1 wherein the airborne server notifies a passenger when the passenger receives a new message file from the ground based server.

3. The improved data retrieval and transmission system of claim 2 wherein the notification from the airborne server to the passenger includes the number of new message files.

4. The improved data retrieval and transmission system of claim 3 wherein the notification further includes a list of attachments, and further wherein the ground-based server transmits only attachments selected by the passenger.

5. The improved data retrieval and transmission system of claim 3 wherein the notification further includes header information for each new incoming message file, and further wherein the ground-based server transmits only new incoming message files selected by the passenger to be transmitted and viewed.

6. The improved data retrieval and transmission system of claim 1 further comprising means on the airborne server for converting data to be transferred between the airborne server and the ground based server to a plurality of sequenced frames, where the airborne server maintains a delivery status of each frame in the sequence;

Where the airborne server, upon interruption of the means for exchanging data during transmission of a sequence of frames, transmits only frames having a status of not already having been delivered.

7. The improved data retrieval and transmission system of claim 1 wherein data exchanged between the airborne server and the ground based server is encrypted prior to said exchange.

8. The improved data retrieval and transmission system of claim 1 wherein data exchanged between the airborne server and the ground based server is compressed prior to said exchange.

9. The improved data retrieval and transmission system of claim 1 further comprising a mail manager for maintaining statistics of the amount of data exchanged for each passenger.

10. The improved data retrieval and transmission system of claim 1 wherein the system maintains statistics on the time of each call attributed to each passenger.

11. The improved data retrieval and transmission system of claim 1 wherein a passenger can request a status of a particular message file sent by the passenger to the ground based server.

12. The improved data retrieval and transmission system of claim 1 wherein the passenger may assign a priority to an outgoing message file to be delivered from the airborne server to the ground based server.

13. The improved data retrieval and transmission system of claim 1 wherein the passenger may assign a priority to an incoming message file to be delivered from the ground based server to the airborne server.

14. The improved data retrieval and transmission system of claim 1 wherein the system maintains information about each data file sent by a passenger, said information comprising sender, recipient, size, and time sent.

15. An improved data retrieval and transmission system for use aboard an aircraft comprising an airborne server connected to at least one passenger's computing device, and ground based server, and a means for exchanging data between the airborne server and the ground based server, the improvement comprising:

call initiating means for initiating a call between the airborne server and the ground based server while the aircraft is in flight, wherein the call initiating means is an automated function of the airborne server predetermined to initiate a call upon the existence of one or more predetermined criteria, and further wherein one of the predetermined criteria is the queuing of outgoing data.

16. The improved data retrieval and transmission system of claim 15 wherein one of the predetermined criteria is the presence of a new detachable passenger computing device connected to the airborne server.

17. The improved data retrieval and transmission system of claim 15 wherein one of the predetermined criteria is a minimum amount of elapsed time since a previous call to the ground server.

* * * * *